United States Patent
Madhusudhanan et al.

(10) Patent No.: US 12,001,910 B1
(45) Date of Patent: Jun. 4, 2024

(54) INITIALIZATION OF TOUCHLESS IDENTITY CARD EMULATOR

(71) Applicant: Oloid Inc., Sunnyvale, CA (US)

(72) Inventors: Madhu Kiran Madhusudhanan, Portola Valley, CA (US); Mohit Garg, Sunnyvale, CA (US); Shankar Agarwal, Bangalore (IN)

(73) Assignee: Oloid Inc., Sunnyvale, CA (US)

( * ) Notice: Subject to any disclaimer, the term of this patent is extended or adjusted under 35 U.S.C. 154(b) by 0 days.

(21) Appl. No.: 18/133,956

(22) Filed: Apr. 12, 2023

(51) Int. Cl.
*G06K 7/10* (2006.01)
*G06K 19/07* (2006.01)

(52) U.S. Cl.
CPC ..... *G06K 7/10366* (2013.01); *G06K 19/0725* (2013.01)

(58) Field of Classification Search
CPC ................... G06K 7/10366; G06K 19/0725
USPC ........................................................ 235/451
See application file for complete search history.

(56) References Cited

U.S. PATENT DOCUMENTS

| | | | | |
|---|---|---|---|---|
| 11,736,466 | B2* | 8/2023 | Gibson | H04L 63/0807 726/9 |
| 2014/0145823 | A1* | 5/2014 | Aase | G07C 9/00309 340/5.61 |
| 2016/0086168 | A1* | 3/2016 | McKelvey | G06Q 20/34 705/64 |
| 2020/0327758 | A1* | 10/2020 | Ma | G07C 9/00571 |
| 2023/0054157 | A1* | 2/2023 | Mao | H04B 5/77 |
| 2023/0078954 | A1* | 3/2023 | Kaufmann | H04L 9/14 713/171 |
| 2023/0376721 | A1* | 11/2023 | Madhusudhanan | H04W 4/80 |

* cited by examiner

*Primary Examiner* — Ahshik Kim
(74) *Attorney, Agent, or Firm* — North Weber & Baugh LLP; Michael North (57) ABSTRACT

Presented are user-friendly battery powered touchless identity card emulator systems and methods that allow existing ID management installations, such as physical card reader systems, to securely operate without requiring a physical key and irrespective of type, model, shape, and size of reader and card format. Various embodiments integrate wireless functionality to existing systems to enable mobile access to provide advanced user/identity management capabilities for access control systems.

20 Claims, 6 Drawing Sheets

INITIALIZATION OF TOUCHLESS IDENTITY CARD EMULATOR

BACKGROUND

A. Technical Field

The present disclosure relates generally to identity card systems and methods for access control.

B. Background

RFID card readers that operate with physical ID cards for establishing credentials or physical identity for access control, e.g., as physical badges, are ubiquitous. In addition to being bulky and easily misplaced or lost, physical badges suffer from various security-related drawbacks, including being prone to copying by malicious actors that may use various known sniffing methods to compromise the integrity of an entire identity card system.

Some approaches that attempt to mitigate the disadvantages of physical badges require a complete redesign of existing card readers that are typically installed in a hardwired fashion. Further, replacing existing access control infrastructure, e.g., to accommodate upgrades that add functionality and/or security features, is a time-consuming, labor-intensive, and costly undertaking that requires rewiring by professional installers, which is exacerbated by different card types and reader types within the same access control system and the need to issue new badges to a large group or users, e.g., the entire workforce of a company.

Accordingly, it is desirable to have low-cost solutions that can upgrade and retrofit existing card reader installations and, ideally, operate securely without the use of a physical key to increase user-friendliness of ID management infrastructure.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that the teachings of the present disclosure may be extended to other applications that may benefit from functionality enabled herein. For example, as used herein, "access" is not be limited to physical access control systems, such as doors or entrances that require that physical ID is established prior to access being granted. The teachings of the present disclosure may be extended from RFID-type card systems that operate in conjunction with a reader or scanner, such as hotel access cards, transit cards, time clock cards, elevator cards, store coupons, loyalty cards, payment cards, and the like, to other applications not expressly listed herein, such as access to computing system, for example, in elevated security environments, such as in a hospital.

DETAILED DESCRIPTION OF EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" or any of their variants shall be understood to be open terms, and any lists of items that follow are examples and not meant to be limited to the listed items. Any headings used herein are for organizational purposes only and shall not be used to limit the scope of the description or the claims. Each reference mentioned in this patent document is incorporate by reference herein in its entirety.

It is noted that embodiments described herein are given in the context of readers, but one skilled in the art shall recognize that the teachings of the present disclosure are not limited to reader applications and may equally be used in other contexts.

In this document "card" and "badge" may be used interchangeably. Similarly, the terms "card reader" and "reader;" "identity card" and "access card;" "emulator," "emulator device," "identity card emulator," "mobile tag," and "m-tag;" "initialization," and "provisioning;" "parameter," "information," and "data;" "cloud platform" and "cloud device;" and the terms "phone," "phone hardware," "app" and "user software" may be used interchangeably. "Reader," recognized by one of skill in the art, refers to any device that wirelessly obtains user credentials, e.g., an RFID card reader. "User" refers to an end-user who uses one or more embodiments to activate an unlock function.

Figure 1:
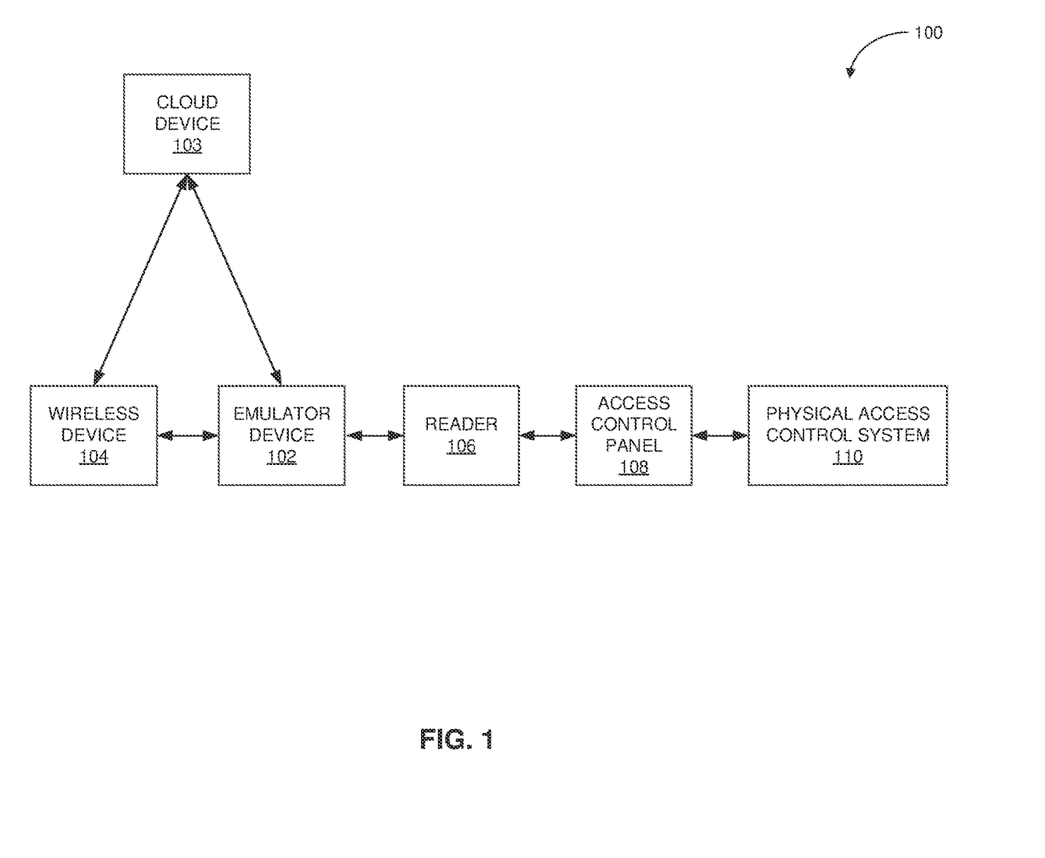
FIG. 1 depicts a typical environment for an emulator device according to various embodiments of the present disclosure.

FIG. 1 depicts a typical environment for an emulator device according to various embodiments of the present disclosure. Environment 100 comprises emulator device 102, wireless communication device 104, reader 106, which may be located in access control panel 108, and physical access control system 110, which may be a cloud-based access control system that uses the internet. Wireless device 104 is any communication device that is capable of wirelessly communicating with other devices, including cloud-device 103, e.g., a smart phone that leverages Bluetooth or any other communication protocol or format to directly or indirectly, e.g., via cloud-device 103, and securely communicate with emulator device 102, which may have its own unique MAC address.

Figure 4:
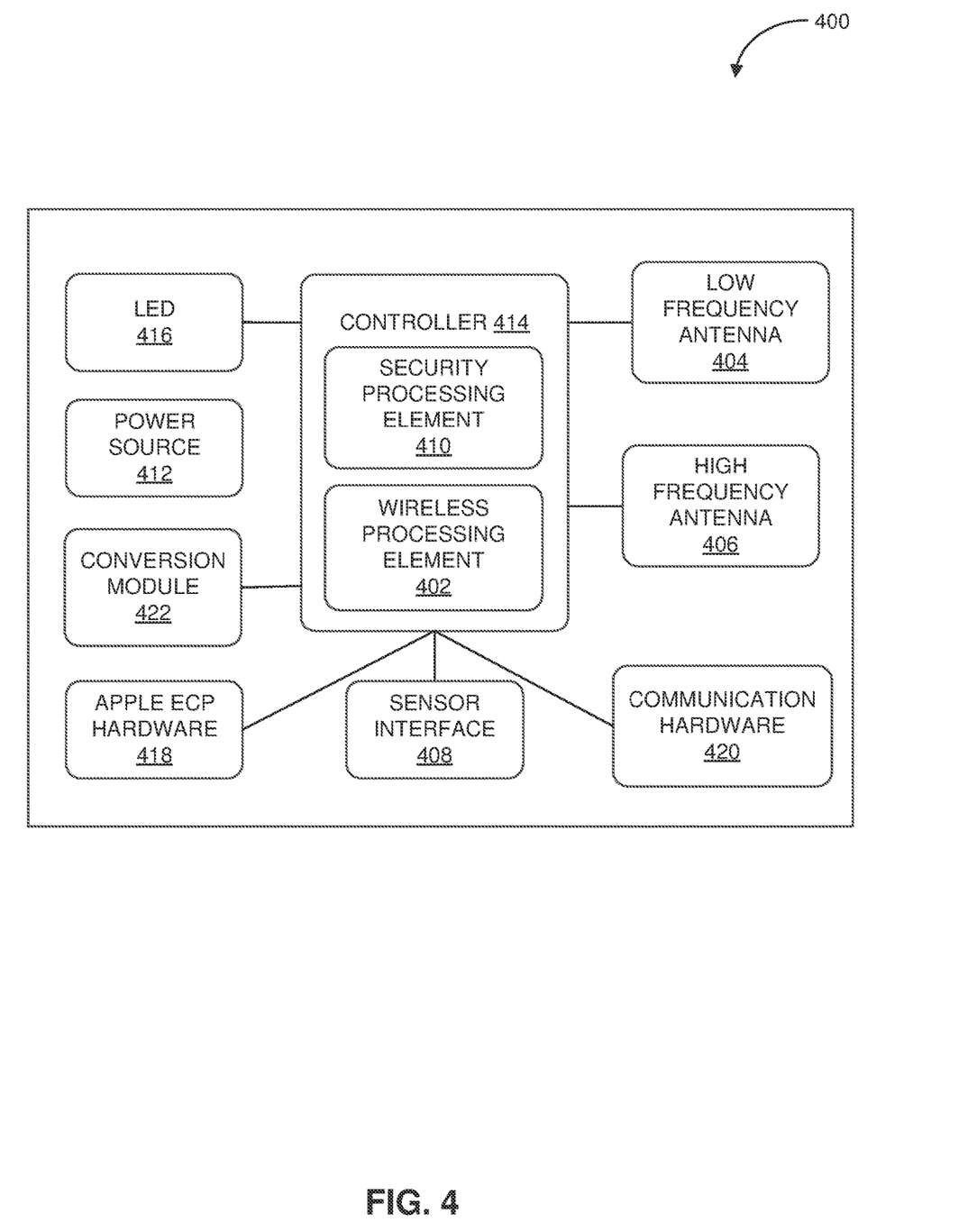
FIG. 4 illustrates an exemplary emulator device according to various embodiments of the present disclosure.

Emulator device 102 is a device according to one or more embodiments herein, for example, emulator device 400 shown in FIG. 4. It is understood that emulator device 102 may be removably attached to an enclosure (not shown) that itself may be removably attached to a housing (e.g., the housing of retrofitting device 202 shown in FIG. 2) that, in embodiments, may be used to at least partially encapsulate access control panel 108. The housing may be a wall-mountable (e.g., door-mounted) device (e.g., a snap-on or more permanent fixture) that may be constructed from any combination of materials. In embodiments, the housing may comprise a weatherproof hardware cover designed to withstand exposure to harsh outdoor conditions. A suitable cover may have particular size that is customized to accommodate one or more different types of readers 106 or reader plus access control panels 108 that each itself may have a different size and be associated with a certain type(s) of physical cards.

Further, housing may comprise one or more security features, such as tamper-resistance mechanism to protect against removal of an installed emulator device 102. A suitable mechanism may comprise a set of motion sensors, such as an accelerometer, to detect indicia of tampering, e.g., an attempt to remove emulator device 102. This may be accomplished, e.g., recording and storing initial accelerometer and/or gyroscope data that may be retrieved to monitor the location of emulator device 102 at any moment in time and take appropriate action once, e.g., a sudden change in the sensor data indicates that tamper attempt has been detected.

In embodiments, location information from a user application associated with wireless device 104, e.g., GPS information, may be correlated with location information, e.g., from an administrator application, where emulator device 102 was initially installed or provisioned; and in the event that a discrepancy of these location is detected, it may be inferred that emulator device 102 has been moved, thus, indicating a tamper attempt. In response thereto, the mechanism may generate an alert. In embodiments, depending on the nature of an alert, emulator device 102 and/or reader 106 may be disabled to protect against unauthorized access.

Access control panel 108 may comprise any reader 106 known in the art, e.g., a physical card reader for reading high-frequency (HF) radio frequency (RF) cards (e.g., MIFARE Classic, MIFARE DESFire EV1/EV2/EV3; Apple ECP 2.0, iCLASS, and iCLASS Seos card formats) or low-frequency (LF) RF cards (e.g., HID® Prox Indala AWID, GE Casi, and Honeywell card formats). Physical access control system 110, which may be hardwired to access control panel 108, may use a translation library to verify the validity of the user's credential prior to determining whether to grant the user access. Once physical access control system 110 determines to grant access, it may use access control panel 108 to initiate an unlocking mechanism. Physical access control system 110 may be used to match user credentials, such as a badge ID, group ID, expiration dates, and other information, which may have been paired or mapped to each other or a user profile. In embodiments, a user may pair wireless device 104 directly with emulator device 102, as discussed further below.

It is understood that environment 100 may comprise other and/or additional components not shown in FIG. 1. It is further understood that embodiments herein are not limited to operation in any particular frequency or frequency spectrum, e.g., ISM bands. For example, wireless device 104 may use a wireless communications link and appropriate communication and/or conversion protocols, including any security protocols known in the art, to communicate with any other device, e.g., over an internet connection.

In operation, emulator device 102 may act as a translator that converts a signal comprising user's credentials that are obtained from wireless device 104, e.g., in an encrypted format, and wirelessly transmits to reader 106 the converted signal in a format that reader 106 can understand. In embodiments, by generating and transmitting to reader 106 selectively a high-frequency (e.g., 13.56 MHz) or low-frequency (e.g., 125 kHz) signal, for example mobile credentials in a proprietary and secure (e.g., encrypted) format similar to that which a physical badge would otherwise transmit (i.e., an RF signal comprising RFID card data, such as a badge ID and/or other content), emulator device 102, in effect, may emulate a physical badge. In embodiments, emulator device 102 may be implemented as a touchless Bluetooth Low Energy (BLE)-to-RFID identity card emulator that, in response to detecting a wireless signal that comprises badge information, generates and transmits to reader 106 a signal that emulates a badge signal that imitates a signal that is typically transmitted to and compatible with reader 106 by a physical badge. As an example, wireless device 104 which, advantageously, may be implemented in a hardware-agnostic fashion, may obtain a user's credentials, such as identification information and wirelessly communicate such credentials, e.g., in Bluetooth format, to emulator device 102.

In embodiments, wireless device 104 may automatically connect to emulator device 102 and vice versa, e.g., in response to emulator device 102 detecting that wireless device 104 is placed within a certain range of emulator device 102. In embodiments, emulator device 102 may comprise components that can measure an RSSI value and interpret such value satisfying a condition (e.g., a threshold)

as an unlock request (or challenge) that commences an unlock procedure. Once emulator device 102 detects wireless device 104 in this manner, emulator device 102 may automatically establish a connection, e.g., over a secure communication channel, with wireless device 104 without user input. Once a communication channel has been established, wireless device 104 may communicate to emulator device 102 the user's encrypted credentials, e.g., the user's badge ID needed to unlock a door.

In embodiments, a user input, such as a tap on a button in an app on a touch screen, may be required to establish a connection between wireless device 104 and emulator device 102. In embodiments, wireless device 104 may receive (e.g., periodically once every few seconds) signals transmitted by emulator device 102 to establish a secure communication channel between wireless device 104 and emulator device 102, e.g., according to a handshake protocol. In embodiments, rather than a user tapping a button on an app or placing the wireless device 104 next to emulator device 102, which may make repeated attempts to wirelessly communicate to activate an unlock procedure, a user may wave their hand at a distance within a certain range near a sensor (not shown in FIG. 1) located within emulator device 102 to trigger a sensor signal. Such a sensor signal may be interpreted by emulator device 102 as a request for access or an intent to unlock a door. In embodiments, the signal may be used to commence a communication between wireless device 104 and emulator device 102, as discussed in greater detail with reference to FIG. 4.

In embodiments, e.g., in a preliminary or setup phase, a user may cause wireless device 104 to download user-related data (e.g., through an API) and import that data (e.g., in a spreadsheet format) from a backend processing system. As a result, once a user activates the app on wireless device 104, or waves their hand in front of a sensor, a door may unlock. For example, in an initial setup step, wireless device 104 may download one or more pre-mapped user credentials to authorize a user. Further, the user may set an app in reading mode to scan a physical ID card. The card information may then be transferred to the app, e.g., for storage in a user profile. The app may further be used to authenticate the identity of the user or the user's mobile device requesting access to determine access control and perform initial authorization steps. It is noted that for wireless device 104 implemented as a smart phone an app may run in the background, e.g., while the smart phone is in a locked condition.

In embodiments, cloud 103 may be used to define how user credentials, such as a badge number that may be constructed for, e.g., a 26-bit, 34-bit, 35-bit, or 37-bit card format, which emulator device 102 is to emulate, may be configured in a manner such that once emulator device 102 obtains the credentials in a secure format, e.g., along with additional types of credentials and user information, emulator device 102 may communicate the credentials to card reader 106 in a format that conforms to a format acceptable to card reader 106. In embodiments, emulator device 102 may utilize a conversion module, such as that shown in FIG. 4, to decrypt the encrypted user credentials such as badge ID, prior to communicating the binary data in a frequency format supported by reader 106. As an example, emulator device 102 may be used to receive encrypted user credential from wireless device 104 and decrypt the data to low-frequency binary data compatible with a low-frequency reader, e.g., a legacy product that otherwise would not be able to communicate with a physical card in an encrypted form. The decryption key and methodology may be configured in the emulator, e.g., through an admin app in wireless device 104. The admin app, in turn, may receive the decryption key and methodology from a cloud device, which may send it to the emulator to provision it.

Advantageously, such embodiments allow user to extend the lifetime of existing low-frequency readers that would otherwise have to be rendered obsolete and replaced with new hardware, thus, unnecessarily incurring additional hardware expenses. In addition, emulator device 102 may extract sufficient information from a physical card, such as card format and number, to automatically provision user data associated with the card. It is understood that any provisioning process that creates user credentials for access control may, in addition to wireless transactions and other user input, comprise a physical card swipe by the user, e.g., to demonstrate possession of the to-be-emulated card.

In embodiments, emulator device 102, in a setup phase, may detect frequencies of signals emitted by reader 106 and communicate such information to wireless device 104. Based on that information, wireless device 104 may configure types of compatible communication formats and protocols, etc., for emulator device 102 that determine how emulator device 102 communicates with reader 106. Configuration may involve, e.g., an IT administrator using a phone app in wireless device 104 that, in embodiments, uses a unique MAC address of emulator device 102 to communicate with emulator device 102, e.g., to open a graphical user interface on which the administrator can specify parameters for emulator device 102. Exemplary parameters or settings may include signal frequency, advertising frequency, advertising signal power, e.g., a detection distance between wireless device 104 and emulator device 102, whether to enable and configure any IR or proximity sensors, e.g., their operating distance, and the like, decryption key that the emulator may use to decrypt the encrypted user credential data received from wireless device 104. It is understood that any configuration may comprise any number of verification and other security steps. Once the administrator completes the provisioning of emulator device 102, emulator device 102 may be updated or rebooted and, in embodiments, a copy of the encrypted parameters may be communicated to cloud platform 103, e.g., for storage, post-processing, and/or analysis by the IT administrator.

In embodiments, wireless device 104 may instruct emulator device 102 to convert signals and data from one specific format to another and instruct emulator device 102 on whether and how to employ a conversion module, e.g., to extract a card number, discussed in greater detail below with reference to FIG. 4. It is understood that emulator device 102 and reader 106 may be pre-configured using default values and modes, such as low-power BLE mode, e.g., to facilitate easy setup and/or save energy.

In embodiments, the user's identity or the user's mobile device that acts as a proxy for the user may be authenticated by performing steps comprising verifying a password, QR code, fingerprint, device code, or location. Physical and/or virtual authentication may further involve using facial recognition or a video feed, 3-way authentication, or any combination thereof, e.g., depending on a desired level of security. It is understood that at least some authentication steps may be performed with the aid of a remote processor, e.g., by using cloud device 103 to match users username and password of users from an app in wireless device 104 using a user's security credentials stored in the cloud. Once a user of wireless device 104 is authenticated, access control may comprise a determination of the user's access rights and verification of access limits based on location (e.g., high-security areas), time (e.g., access expiration dates), credential-based access restrictions, and conditional access (e.g., vaccination status).

In embodiments, authorization may comprise the generation of a confidence score, e.g., based on the presence of an anomaly that may be based on, e.g., tracking data or any other data that allows an identification of the user. Advantageously, there is no need to store and manage any confidential information, such as customer data, which may be stored and handled remotely. Emulator device 102, e.g., upon authorizing a user, may communicate with reader 106, e.g., using an LF or HF signal having a specific format, a request to unlock a door. In embodiments, emulator device 102 may communicate, e.g., via Bluetooth or BLE, with a remote device (not shown) that, in response to detecting a potential (e.g., indicia of a tamper event) or actual security breach, may cause emulator device 102 to employ a security mechanism. An exemplary security mechanism may comprise destroying or modifying an encryption key and/or triggering an alarm to perform some predefined action.

It is understood that emulator device 102 may communicate its operational status (e.g., battery charge level), any type of configuration data (e.g., location information), or any other information to the app. Emulator device 102 may do so, for example, in periodic time intervals, based on user traffic or at user-selectable intervals. In embodiments, the remote device may be used to perform a remote unlock operation. In addition, remote device may run a rule-based access control software, e.g., to act as a video intercom that utilizes facial recognition and/or computer vision. Matching credentials in this manner is useful when facilitating a network unlock, e.g., in scenarios in which a user forgot or lost wireless device 104.

Additional uses of the remote device comprise utilizing a thermal camera to perform a temperature scan, facilitating a QR code service, and the like. It is understood that any combination of the remote device, wireless device 104, and emulator device 102 may be used to obtain other useful information, such as an occupancy count (e.g., for emergency purposes), serve as a visitor management tool (e.g., to validate reservations and track attendance) or increase system security (e.g., by generating and sending tailgating alerts). For example, in embodiments, by directly or indirectly detecting, e.g., Bluetooth-enabled or GPS-enabled devices that pass emulator device 102, a number of users that fail to use wireless device 104 to commence a transaction, such as sending credentials to emulator device 102, may be detected from which a number of tailgating events may be determined. Similarly, advantageously, the number of users leaving an access-restricted area may be counted, documented, automatically logged out, and so on.

Figure 2:
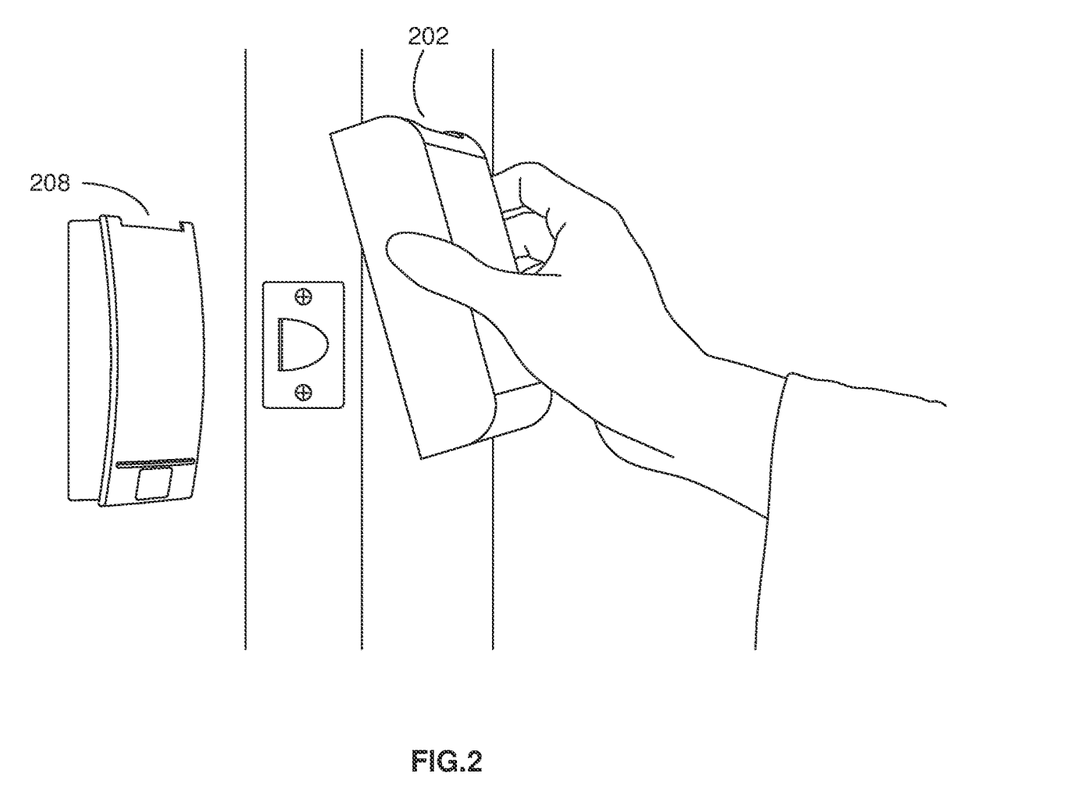
FIG. 2 illustrates a retrofitting device for use on an existing RFID reader, according to various embodiments of the present disclosure.
Figure 3:
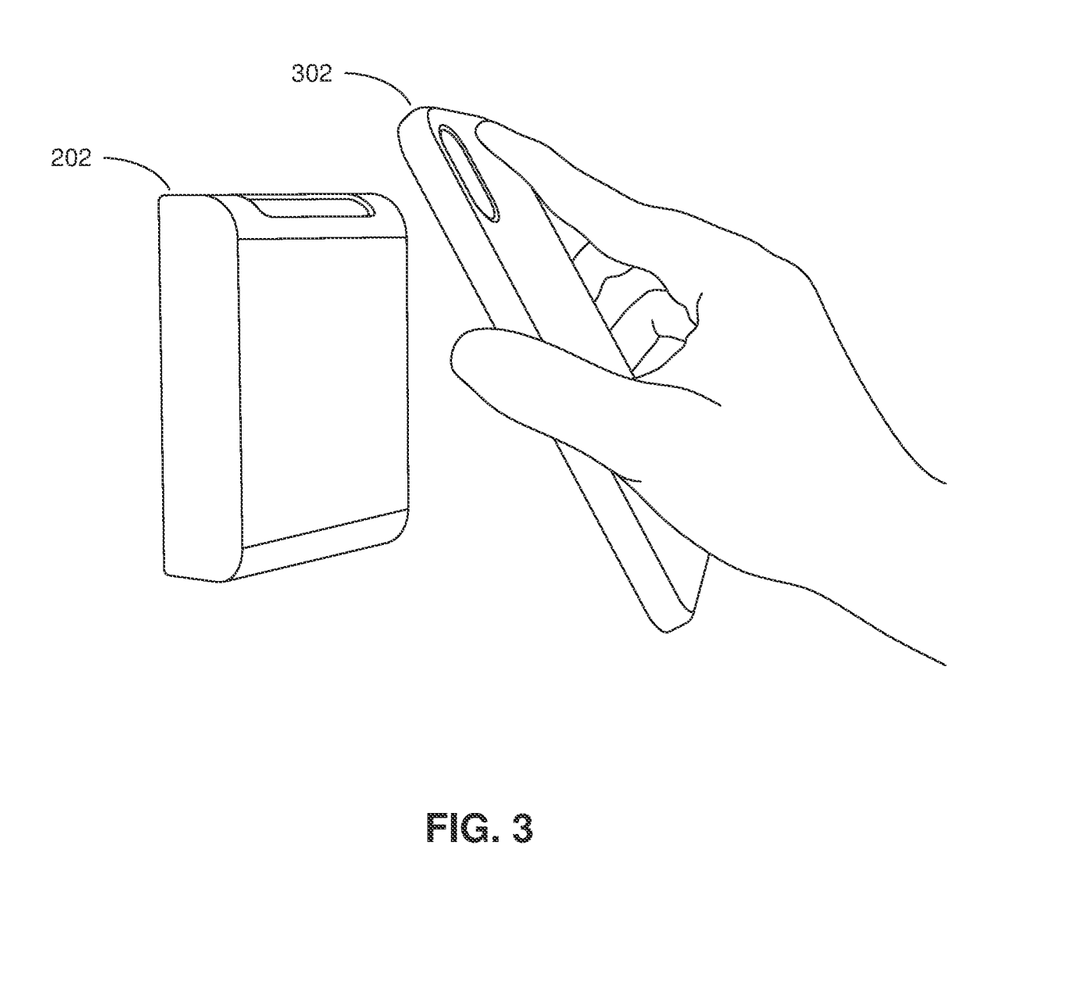
FIG. 3 illustrates an exemplary use of a wireless device for communicating with a retrofitting device according to various embodiments of the present disclosure.

FIG. 2 illustrates a retrofitting device 202 for use on an existing RFID reader 208, according to various embodiments of the present disclosure. FIG. 3 illustrates an exemplary use of wireless device 302 for communicating with retrofitting device 202 according to various embodiments of the present disclosure.

FIG. 4 illustrates an exemplary emulator device according to various embodiments of the present disclosure. In embodiments, emulator device 400 comprises power source 412, wireless processing element 402, one or more antennae 404, 406, sensor interface 408, security processing element 410, controller 414, LED 416, Apple ECP hardware 418, communication hardware 420, and conversion module 422. Wireless processing element 402 may comprise communication hardware 420, e.g., a BLE processor that may operate at the 2.400 GHz-2.4835 GHz frequency range and emit beacon signals as well as transmit BLE advertising packets.

In operation, wireless processing element 402 may be used to establish a secure wirelesses connection to an end-user's mobile device, such wireless device 104 shown in FIG. 1, to exchange encrypted data. The encrypted data, which may comprise user credentials, such as a card ID associated with an RFID card, may be decrypted by security processing element 410 to recover the user's credentials, e.g., in plain text.

In embodiments, security processing element 410 may provide the decrypted data, e.g., after it has been processed by controller 414, to wireless processing element 402 that may wirelessly transmit the credentials to a reader or scanner.

Conversion module 422, which, in embodiments, may be embedded into wireless processing element 402, may convert, for example, badge ID data into a high-frequency format that is compatible with a reader, such as that shown in FIG. 1, e.g., to emulate a high-frequency card that is compatible with a high-frequency reader, such as to enable a unique card number associated with a card to be read by the high-frequency reader. Advantageously, this enables users to gain access by reusing existing physical cards on reader systems that would otherwise remain incompatible and, thus, inaccessible to such existing cards. It is understood that, in embodiments, conversion module 422 may comprise sub-modules, such as a LF/HF conversion module and/or a format conversion module (not shown in FIG. 4).

Security processing element 410 may be implemented as an authentication module that comprises memory to store an decryption key. In embodiments, Security processing element 410 may comprise any state machine known in the art. As depicted in FIG. 4, security processing element 410 may be embedded in controller 414, which may directly or indirectly communicate with and control any number of components in emulator device 400. It is understood that any component of emulator device 400 may be a standalone component or integrated with one or more other components.

In embodiments, wireless processing element 402 may convert the decrypted data into a format typically generated by an RFID card and read by a reader, such as reader 106 in FIG. 1 to emulate a desired RFID card. The converted data may then be transmitted to the reader, e.g., using one or more antennae. In embodiments, antenna 404 depicted in FIG. 4 may be implemented as a 125 kHz LF antenna, and antenna 406 may be implemented as a 13.56 MHz HF antenna. In operation, antenna 404 may receive, e.g., in a read mode, authentication data from an LF proximity 125 kHz card and communicate at least some of the received data, e.g., over a Bluetooth connection, to a mobile app. Conversely, antenna 404 may transmit the authentication data, e.g., in a write mode, to a reader device. Similarly, antenna 406 may, in a read mode, receive authentication data from a 13.56 MHz-compatible card and communicate the received data over a Bluetooth connection to the mobile app. Antenna 406 may then transmit authentication data to a reader device.

In embodiments, any number of sensors may removably attach to sensor interface 408 and may be implemented as proximity sensor (or intent sensor), infrared sensor, and the like. In embodiments, a sensor may detect a gesture, such as a user waving in front of the sensor, and interpret the gesture as an intent to request access. In embodiments, advantageously, to conserve energy, a gesture may be used to determine when to commence a wireless communication between wireless processing element 402 and an external wireless device. In embodiments, sensor interface 408 may communicate with controller 414 or wireless processing element 402 to cause a signal to increase BLE advertising packets to commence an unlock procedure. Additionally, emulator device 400 may use sensor interface 408 to obtain card information from a reader or a card, e.g., in an initialization process that acquires card information related to a user. Alternatively, that information may be obtained from a backend processing system.

In embodiments, power source 412, which may power any number of components in emulator device 400, may be implemented as a set of batteries, e.g., a rechargeable battery that is removable attached within an enclosure, which, as previous mentioned, may be removably attached to a housing. One skilled in the art will appreciate that power source 412 may be implemented as a stack(s) of cells or a number of interconnected batteries. In embodiments, a battery pack may serve as a backup battery and may be placed external to emulator device 400 within the housing. The battery pack may be used to extend the lifetime of the internal battery. However, this is not intended as a limitation on the scope of the present disclosure since it is understood that a battery pack may be used to power emulator device 400, e.g., to preserve the internal battery for use as a backup battery. In embodiments, a user may install a battery pack by placing it at a pre-defined location within the enclosure and connecting the battery pack to emulator device 400, e.g., via a micro-USB connection.

In embodiments, each of one or more LEDs 416 may be optically coupled to a light pipe or waveguide that may extend from a location near LED 416 to a surface of the enclosure that houses emulator device 400. In operation, LED 416 may provide optical feedback, e.g., to serve as a power on/off indicator. In embodiments, LED 416 may be used as a basic debugging tool, for example, to communicate to an administrator an error or an operation status of emulator device 400, such as a successful pairing, a BLE connection, or other status information.

It is understood that emulator device 400 may comprise any number and combination of additional or different components. For example, emulator device 400 may comprise a microcontroller, memory, additional or different antennae, interfaces, a factory reset button, components to enable reading, writing, and communicating data according to any known wired or wireless communication protocol, e.g., at different spectra, power levels, and levels of encryption, if any.

Figure 5:
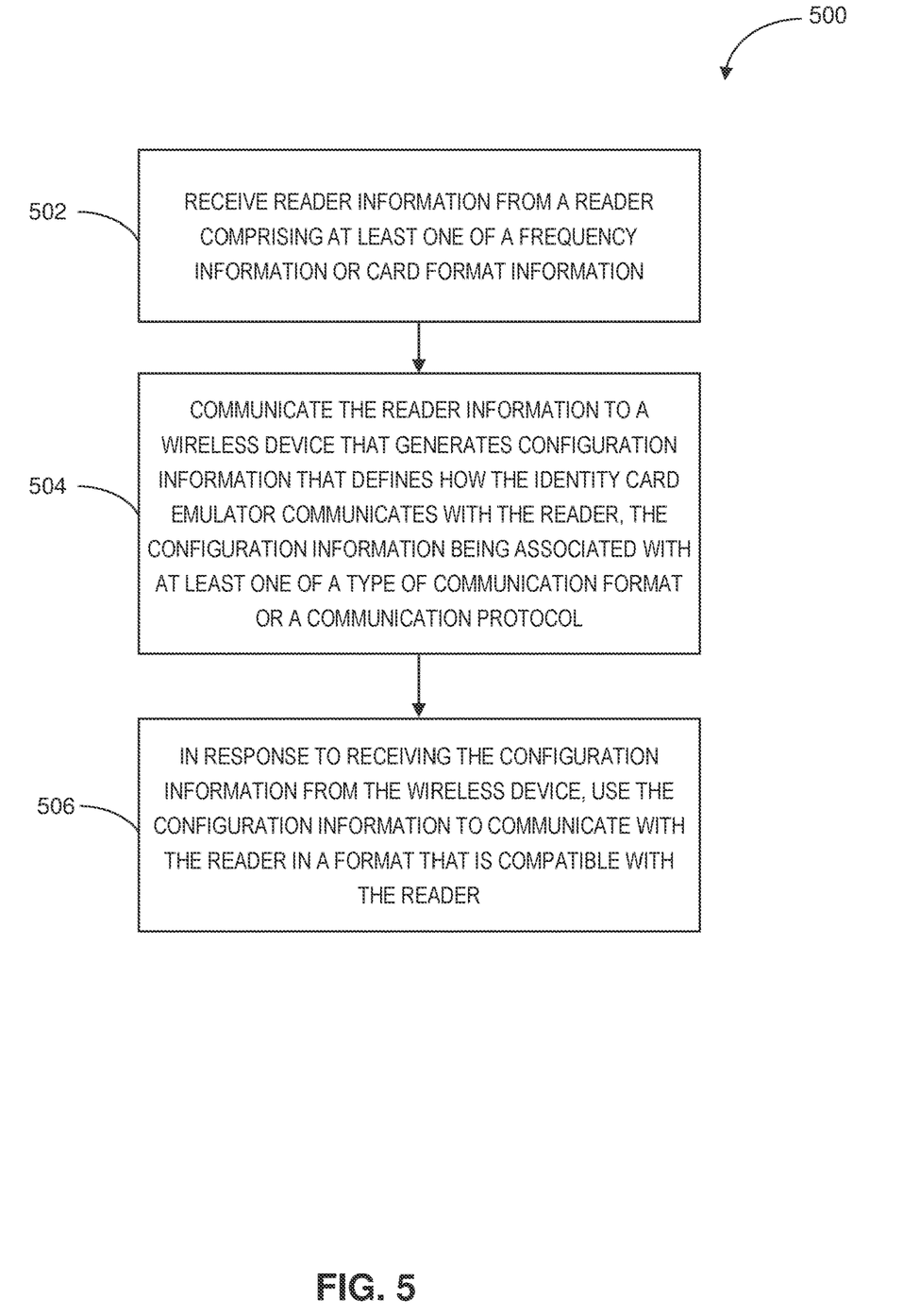
FIG. 5 is a flowchart of an illustrative process for using an identity card emulator according to various embodiments of the present disclosure.

FIG. 5 is a flowchart of an illustrative process for using an identity card emulator according to various embodiments of the present disclosure. In embodiments, process 500 may start at step 502 when an identity card emulator receives, e.g., from a reader, information that comprises at least one of a frequency information or card format information.

At step 504, the identity card emulator may communicate the reader information to a wireless device, which may use at least some of the reader information to generate configuration information. The configuration information may define, for example, how the identity card emulator should communicate with the reader. In embodiments, the configuration information is associated with at least one of a type of communication format or a communication protocol.

At step 506, in response to receiving the configuration information from the wireless device, the identity card emulator may use the configuration information to communicate data with the reader in a format compatible with the reader.

Figure 6:
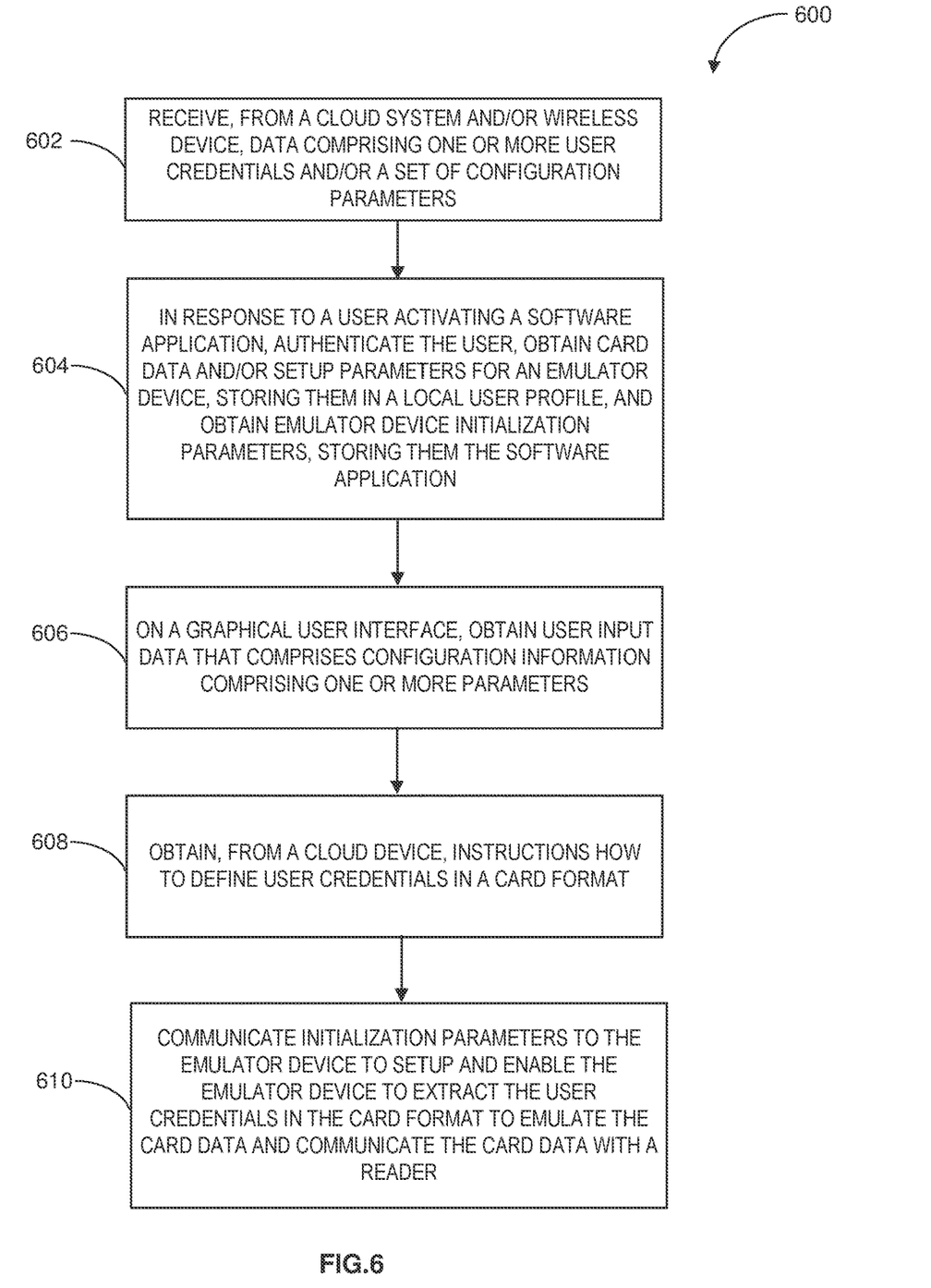
FIG. 6 is a flowchart of an illustrative process for communicating data from a cloud system and/or wireless device to an emulator device to provision and initialize the emulator device according to various embodiments of the present disclosure.

FIG. 6 is a flowchart of an illustrative process for communicating data from a cloud system and/or wireless device to an emulator device to provision and initialize the emulator device according to various embodiments of the present disclosure. In embodiments, process 600 may start at step 602, when a wireless device receives, e.g., from a backend processing system, data that comprises one or more user credentials and/or a set of configuration parameters for initializing an emulator device. In response to a user activating a software application, e.g., by launching and logging into a software application to obtain card data, user profile data, and/or other set up parameters for the emulator device, the wireless device may, at step 604, authenticate the user, obtain the card data and store it in a local user profile, and also obtain emulator device initialization parameters and store them in the software application.

At step 606, the wireless device may use the software application to obtain, e.g., on a graphical user interface, user input data that comprises configuration information comprising one or more parameters.

At step 608, the wireless device may then obtain, e.g., from the cloud device, instructions how to define user credentials in a card format.

Finally, at step 610, the wireless device may communicate the initialization parameters, such as advertising interval, advertising signal power, NFC on/off, sensor on/off, sensor power, high/frequency emulation, decryption key to the emulator device to provision and setup the emulator device and enable it to extract the user credentials in the card format to emulate the card data and communicate the card data with the reader.

One skilled in the art will recognize that: (1) certain steps herein may optionally be performed; (2) steps may not be limited to the specific order set forth herein; (3) certain steps may be performed in different orders; and (4) certain steps may be done concurrently.

In embodiments, the wireless communication device may obtain authentication information in the form of encrypted user credentials, e.g., in a setup or pairing process, and validate the user's credentials. Validated credentials may be used to pair the wireless communication device with the identity card emulator. Pairing may involve the wireless communication device obtaining a unique encryption key to encrypt the user's credentials, e.g., the user's badge/card number in a binary format. This enables secure communication between the wireless communication device and the device that will receive the user's credentials in an encrypted format.

In embodiments, an administrator may log into an administrator software, e.g., a mobile phone app to commence a pairing process. Pairing may begin when the administrator software establishes a communication with a nearby emulator device, e.g., to register the device ID with an online account. Such an account may be serviced at by a backend access control system that prevents unauthorized use of the device, e.g., by communicating a security certificate for the secure transmission of the data. After performing, for example, a firmware update, the administrator software may transmit configuration data to and from the device to enable the device to communicate with one or more readers, e.g., in a format that is compatible with each reader. Exemplary configuration data may comprise reader information, security certificates or decryption keys, including default keys, battery modes (e.g., eco), preferred modes of operation (BLE Advertising frequency, BLE Advertising signal power or advertising distance, Sensor Sensitivity distance), location data, card formats, desired communication frequencies, etc., that may be stored, e.g., in the firmware of the device.

It is understood that an administrator may, in addition to using the administrator software to obtain emulator provisioning information from the backend access control system, may also obtain, e.g., on an administrator software GUI, input from a user. In embodiments, the administrator software may communicate initialization parameters to an emulator device to set up the emulator device and then reboot the emulator device to cause the initialization parameters to take effect. The administrator software may further use user credentials to test the emulator setup.

In embodiments, a wireless communication device may establish a secure communication with the identity card emulator, e.g., in response to receiving a user input and/or detecting a wireless signal and context data to determine a risk level associated with an access request and/or a user. One or more authentication methods and/or risk levels may be indicated to the user, e.g., via the wireless communication device and, based on the risk level, the user may be authenticated. The wireless communication device may wirelessly communicate user credentials as encrypted data to the identity card emulator, e.g., to activate an unlocking mechanism.

One skilled in the art will recognize no computing system or programming language is critical to the practice of the present invention. It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An identity card emulator comprising:
   a housing configured to at least partially enclose a reader, the reader being located within an access control system;
   a wireless processing element to receive, from the reader, reader information that comprises at least one of a frequency information or card format information during an initialization process;
   a communication interface to communicate the reader information to a wireless device that uses the reader information to generate configuration information that defines how the identity card emulator communicates with the reader, the configuration information defines at least one of a type of communication format or a communication protocol that is compatible with the reader.

2. The identity card emulator according to claim 1, wherein the identity card emulator comprises a conversion module that is embedded into the wireless processing element.

3. The identity card emulator according to claim 2, wherein the conversion module, depending on the reader, converts encrypted card data to high-frequency data or low-frequency data.

4. The identity card emulator according to claim 2, wherein the conversion module emulates a high-frequency card that is compatible with a high-frequency reader to enable a unique card number associated with a low-frequency card to be read by the high-frequency reader.

5. The identity card emulator according to claim 1, wherein the configuration information comprises one or more parameters that comprise at least one of:
   a low-frequency application signal frequency;
   a high-frequency application signal frequency;
   an advertising frequency;
   an advertising signal power;
   a security parameter; or
   information that indicates whether to enable and configure an infrared or proximity sensor.

6. The identity card emulator according to claim 5, wherein the advertising signal power comprises a distance between the wireless device and the identity card emulator.

7. The identity card emulator according to claim 1, wherein the configuration information comprises authentication data that causes the reader to grant access to a restricted area.

8. The identity card emulator according to claim 1, wherein the identity card emulator comprises a detection circuit that obtains the reader information, and wherein the frequency information comprises one or more signals frequencies emitted by the reader.

9. The identity card emulator according to claim 1, wherein the identity card emulator comprises default values that have been pre-configured.

10. A method for using an identity card emulator, the method comprising:
    receiving reader information from a reader comprising at least one of a frequency information or card format information;
    communicating the reader information to a wireless device that generates configuration information that defines how the identity card emulator communicates with the reader, the configuration information being associated with at least one of a type of communication format or a communication protocol; and
    in response to receiving the configuration information from the wireless device, using the configuration information to communicate with the reader in a format that is compatible with the reader.

11. The method according to claim 10, further comprising:
    detecting at least one of Bluetooth data or GPS data of wireless devices in proximity of the identity card emulator;
    determining a number of the wireless devices that have communicated credentials to the identity card emulator to gain access to an access-restricted area; and
    using the number to detect at least one of a number of tailgating events or a number of wireless devices exiting the access-restricted area.

12. The method according to claim 11, further comprising using the number of wireless devices exiting the access-restricted area counted to automatically log out users associated with the exiting wireless devices.

13. The method according to claim 10, further comprising comparing sensor data of at least one of a location sensor or a vibration sensor, which is removably attached to the identity card emulator, with sensor data that has been recorded in an initialization phase to detect a discrepancy that is indicative of a tamper attempt.

14. The method according to claim 13, further comprising comparing location information of the wireless device that has been recorded in the initialization phase with location information of the identity card emulator and using a difference in the location information as indicia of unauthorized removal of the identity card emulator.

15. The method according to claim 10, wherein the wireless device uses a unique MAC address to communicate the configuration information in a setup phase that concludes with an updating or rebooting of the identity card emulator.

16. A method for communicating data from a to-be-emulated physical card to an emulator device, the method comprising:
- receiving from a backend processing system data that comprises one or more user credentials; and
- in response to a user activating a software application, performing steps comprising:
- authenticating the user;
- obtaining card data and emulator device initialization parameters;
- storing the card data in a user profile;
- storing the emulator device initialization parameters in the software application; and
- using the software application to perform steps comprising:
  - on a graphical user interface, obtaining user input data that comprises configuration information comprising one or more parameters;
  - obtaining, from a cloud device, instructions how to define user credentials in a card format; and
  - communicating the emulator device initialization parameters to the emulator device to enable the emulator device to extract the user credentials, emulate the card data, and communicate the card data to a reader.

17. The method according to claim 16, wherein the card format is one of a 26-bit, 34-bit, 35-bit, or 37-bit card format.

18. The method according to claim 16, wherein the cloud device generates the configuration information, the configuration information comprising one or more types of communication formats and protocols compatible with the reader.

19. The method according to claim 16, wherein the cloud device communicates at least some of the user credentials to the emulator device in an encrypted format.

20. The method according to claim 16, wherein the one or more parameters comprise at least one of:
- a low-frequency application signal frequency;
- a high-frequency application signal frequency;
- an advertising frequency;
- an advertising signal power;
- a security parameter; or
- information that indicates whether to enable and configure an infrared or proximity sensor.

\* \* \* \* \*